US008906993B2

(12) United States Patent
Sekito et al.

(10) Patent No.: US 8,906,993 B2
(45) Date of Patent: Dec. 9, 2014

(54) COATING COMPOSITION CONTAINING SILOXANE RESIN

(75) Inventors: Takashi Sekito, Kakegawa (JP); Daishi Yokoyama, Kakegawa (JP); Takashi Fuke, Kakegawa (JP); Yuji Tashiro, Kakegawa (JP); Toshiaki Nonaka, Kakegawa (JP); Yasuaki Tanaka, Tokyo (JP)

(73) Assignee: AZ Electronic Materials USA Corp., Somerville, NJ (US)

( * ) Notice: Subject to any disclaimer, the term of this patent is extended or adjusted under 35 U.S.C. 154(b) by 0 days.

(21) Appl. No.: 14/110,322

(22) PCT Filed: Apr. 11, 2012

(86) PCT No.: PCT/JP2012/059892
§ 371 (c)(1), (2), (4) Date: Oct. 7, 2013

(87) PCT Pub. No.: WO2012/141208
PCT Pub. Date: Oct. 18, 2012

(65) Prior Publication Data
US 2014/0024758 A1 Jan. 23, 2014

(30) Foreign Application Priority Data
Apr. 12, 2011 (JP) ................................ 2011-088330

(51) Int. Cl.

| | |
|---|---|
| ***C08K 5/06*** | (2006.01) |
| ***C08K 5/053*** | (2006.01) |
| ***C09D 183/06*** | (2006.01) |
| ***G02B 1/10*** | (2006.01) |
| ***G02B 1/11*** | (2006.01) |
| ***C09D 7/00*** | (2006.01) |
| ***C09D 7/12*** | (2006.01) |
| ***C09D 183/04*** | (2006.01) |
| ***C08G 77/04*** | (2006.01) |

(52) U.S. Cl.
CPC .............. *C09D 183/06* (2013.01); *G02B 1/105* (2013.01); *G02B 1/111* (2013.01); *C09D 7/001* (2013.01); *C09D 7/125* (2013.01); *C09D 183/04* (2013.01); *C08G 77/045* (2013.01)
USPC ............................ 524/377; 524/378; 524/386

(58) Field of Classification Search
CPC .................................. C08K 5/053; C08K 5/06
USPC .......................... 524/366, 377, 378, 386, 387
See application file for complete search history.

(56) References Cited

U.S. PATENT DOCUMENTS

| | | | | |
|---|---|---|---|---|
| 5,531,814 | A * | 7/1996 | Bahr et al. | 106/3 |
| 5,939,478 | A * | 8/1999 | Beck et al. | 524/266 |
| 6,627,705 | B2 | 9/2003 | Kobayashi et al. | |
| 6,750,308 | B2 | 6/2004 | Andoh et al. | |
| 6,835,424 | B2 * | 12/2004 | Larson et al. | 427/553 |
| 8,153,724 | B2 * | 4/2012 | Maton et al. | 524/588 |
| 2002/0139956 | A1 * | 10/2002 | Simendinger et al. | 252/70 |
| 2003/0105207 | A1 * | 6/2003 | Kleyer et al. | 524/439 |
| 2009/0221778 | A1 | 9/2009 | Muramatsu et al. | |

FOREIGN PATENT DOCUMENTS

| | | | |
|---|---|---|---|
| JP | 4-45154 | A | 2/1992 |
| JP | 8-334901 | A | 12/1996 |
| JP | 9-111187 | A | 4/1997 |
| JP | 11-310771 | A | 11/1999 |
| JP | 2000-26726 | A | 1/2000 |
| JP | 2001-49172 | A | 2/2001 |
| JP | 2001-354771 | A | 12/2001 |
| JP | 2002-105316 | A | 4/2002 |
| JP | 2002-212502 | A | 7/2002 |
| JP | 2003-137944 | A | 5/2003 |
| JP | 2004-99879 | A | 4/2004 |
| JP | 2006-83319 | A | 3/2006 |
| JP | 2006-348303 | A | 12/2006 |
| JP | 2009-7390 | A | 1/2009 |
| JP | 2009-26457 | A | 2/2009 |
| JP | 2011-63794 | A | 3/2011 |
| WO | WO 2009/069182 | A1 | 6/2009 |

OTHER PUBLICATIONS

Machine Language English Abstract from JPO of JP 4-45154 A.

* cited by examiner

*Primary Examiner* — Peter Szekely
(74) *Attorney, Agent, or Firm* — Sangya Jain

(57) ABSTRACT

[Object]
To provide a coating composition excellent in coatability and free from viscosity increase caused by degradation over time, and also to provide a hardened film-formation method employing that.
[Means]
The present invention provides a coating composition comprising: a siloxane resin having silanol groups or alkoxysilyl groups, and a polyol having hydroxyl groups at both ends of a straight 2 to 5 carbon atom hydrocarbon chain. This coating composition enables to form a hardened film of high transparency, of high insulation and of low dielectricity.

16 Claims, No Drawings

COATING COMPOSITION CONTAINING SILOXANE RESIN

This application is a United States National Stage Patent Application under 35 U.S.C. §371 of International Patent Application No. PCT/JP2012/059892, filed Apr. 11, 2012, which claims priority to Japanese Patent Applications No. 2011-088330, filed Apr. 12, 2011, the contents of both documents being hereby incorporated herein by reference.

TECHNICAL FIELD

The present invention relates to a coating composition comprising a siloxane resin, in particular, a siloxane resin having silanol groups or alkoxysilyl groups.

BACKGROUND ART

Siloxane resins are known to be materials from which films of high heat resistance, of high durability, of high hardness, of low dielectricity, of high insulation and of high transparency can be formed by thermal curing to hardening (hereinafter, often simply referred to as "hardening"), and hence are used for various applications. For example, they are employed for forming insulating films, planarization films or protective films in semiconductor devices and liquid crystal displays, and also adopted as sealants of semiconductor devices. Further, since having high transparency, they are used not only as materials in the field of electronics but also as materials for forming surface protective films of optical elements and automobiles.

In the case where a cured film is intended to be formed from a coating composition comprising a solvent and a siloxane resin serving as a binder, it is known to employ a multifunctional polysiloxane having alkoxy groups or hydroxyl groups (Patent documents 1 and 2). However, as far as the present inventors know, the above multifunctional polysiloxane has room for improvement in view of stability in a solution. Specifically, if the composition has high viscosity or high solid content, that multifunctional polysiloxane can suffer from a problem of easily gelling or getting more viscous immediately after addition of a hardening agent or a catalyst, such as, an acidic compound, a basic compound, a metal alkoxide or a metal chelate compound. Further, even if neither gelling nor getting more viscous immediately after the addition, the multifunctional polysiloxane often experiences an increase in viscosity while being stored.

This problem is presumed to be because the above siloxane resin has alkoxy groups or hydroxyl groups. Accordingly, in order to avoid the problem, it is studied to adopt a siloxane resin having neither alkoxy groups nor hydroxyl groups. However, that siloxane resin often has too low reactivity to be hardened sufficiently by curing. Further, it is also studied to use a siloxane resin in which the alkoxy or hydroxyl groups are replaced with other organic reactive groups. However, that siloxane resin is often unsatisfactory in some respects, such as, thermal stability, electric properties and the like of the resultant film. In addition, it is often disadvantageous in view of the cost to employ a multifunctional polysiloxane whose structure or reactive groups are not typical (Patent documents 3 to 6).

PRIOR ART DOCUMENTS

Patent Documents

[Patent document 1] Japanese Patent Laid-Open No. 2004-99879

[Patent document 2] Japanese Patent Laid-Open No. 2009-7390

[Patent document 3] Japanese Patent Laid-Open No. 2002-105316

[Patent document 4] Japanese Patent Laid-Open No. 2003-137944

[Patent document 5] Japanese Patent Laid-Open No. 2001-354771

[Patent document 6] Japanese Patent Laid-Open No. 8 (1996)-334901

DISCLOSURE OF INVENTION

Problem to be Solved by the Invention

It is an object of the present invention to provide a coating composition comprising a siloxane resin free from the above problem. Specifically, the present invention aims to provide a coating composition which comprises a silanol or alkoxysilyl group-containing siloxane resin, which has improved storage stability and which enables to form a hardened film of high transparency, of high insulation and of low dielectricity.

Means for Solving Problem

The present inventors have studied and finally found that, if a silanol or alkoxysilyl group-containing siloxane resin is used in combination with a particular polyol, it is possible to obtain a coating composition realizing both satisfying storage stability and excellent properties of the siloxane resin. The present invention is thus achieved on the basis of this finding.

The present invention resides in a coating composition comprising a siloxane resin having silanol groups or alkoxysilyl groups, and a polyol represented by the following formula (1):

$$HOCH_2-(CH_2)_l-(CH(OH))_m-(O)_n-CH_2OH \qquad (1)$$

in which l is 0 to 3, m is 0 or 1, and n is 0 or 1, provided that they satisfy the condition of $0 \leq l+m+n \leq 3$; and each of the repeating units $-(CH_2)-$, $-(CH(OH))-$ and $-(O)-$ can be randomly combined with each other.

The present invention also resides in a siliceous film obtained by the steps of:

coating a substrate with the above coating composition, and curing the coated substrate at 150 to 450° C. in air or in an inert gas atmosphere.

Effect of the Invention

In the present invention, a particular alcohol is incorporated into a coating composition in which a silanol or alkoxysilyl group-containing resin serving as the siloxane resin is diluted with a desired solvent, so as to prevent the viscosity increase caused by time degradation and thereby to provide a coating composition having excellent properties, specifically, to provide a coating composition causing less unevenness in the formed coating. Further, the coating composition according to the present invention enables to form a hardened film of high transparency, of high insulation and of low dielectricity.

BEST MODE FOR CARRYING OUT THE INVENTION

Embodiments of the present invention will be described below in detail.

The following is detailed explanation of the coating composition comprising a silanol or alkoxysilyl group-containing siloxane according to the present invention.

Coating Composition

The coating composition according to the present invention comprises a particular siloxane resin, a particular polyol, and, if necessary, other solvents and additives.

(a) Siloxane Resin

The siloxane resin adopted in the present invention has silanol groups or alkoxysilyl groups. In the present invention, the terms "silanol groups" and "alkoxysilyl groups" mean hydroxyl groups and alkoxy groups, respectively, which directly connect to silicon atoms constituting the siloxane skeleton. Those groups function as reactive groups when the coating composition undergoes a hardening reaction.

The siloxane resin used in the present invention has no particular restrictions on its structure as long as containing silanol and/or alkoxysilyl groups capable of serving as reactive groups. According to the number of oxygen atoms connecting to silicon atoms, the structure of siloxane resin can be generally categorized into the following three skeletons, that is: silicone skeleton (in which two oxygen atoms connect to silicon atoms), silsesquioxane skeleton (in which three oxygen atoms connect to silicon atoms), and silica skeleton (in which four oxygen atoms connect to silicon atoms). In the present invention, the siloxane resin can have any of those skeletons. Further, the structure of the siloxane resin can be a combination of two or more of them. Furthermore, the siloxane resin used in the present invention can be a mixture of resins having those structures. However, if containing the silicone structure too much, the resin tends to break easily at a high temperature. Accordingly, the amount of the silicone structure is preferably 10 mol % or less based on the whole siloxane resin. It is particularly preferred for the resin to have the silsesquioxane structure or a mixture of the silsesquioxane structure and the silica structure. That is because the hardening reaction tends to proceed rapidly in film-formation and also because the composition has such favorable treatability as to be less sticky after coating. If having a mixture of the silsesquioxane and silica structures, the resin preferably contains the silsesquioxane structure as much as possible. If the silica structure is contained too much, the composition has such low stability that the viscosity can increase. Accordingly, the amount of the silica structure is preferably 20 mol % or less, further preferably 10 mol % or less, based on the whole siloxane resin.

The siloxane resin employed in the present invention has silanol groups or alkoxysilyl groups. As described above, those groups are presumed to contribute toward the hardening reaction and also to have an effect on the storage stability. Even if containing those groups in a very small amount, the siloxane resin can bring the effect of the present invention. However, the favorable number of the groups is considered to depend on the molecular weight of the siloxane resin. Accordingly, in order to contain a favorable number of silanol groups or alkoxysilyl groups, the siloxane resin preferably has a molecular weight in the range described later.

The siloxane resin can have reactive groups other than the silanol or alkoxysilyl groups, such as, carboxyl groups, sulfonyl groups, and amino groups, unless they impair the effect of the present invention. However, since those reactive groups generally tend to lower the storage stability of the composition, they are preferably contained in a small amount. Specifically, the amount thereof is preferably 10 mol % or less based on the total number of hydrogen atoms or substituent groups connecting to silicon atoms. Further, it is particularly preferred for the resin not to contain those reactive groups at all. Here, the above "substituent groups" means substituent groups that do not contain Si—O bonds constituting the siloxane structure. Examples thereof include alkyl groups, alkenyl groups, allyl groups, and hydroxyalkyl groups.

There are no particular restrictions on the amount of the siloxane resin contained in the coating composition of the present invention. The content of the siloxane resin is properly controlled according to the kind of the resin and to the aimed use of the composition. However, in order to obtain a coating of sufficient thickness, the siloxane resin is preferably contained in a large amount. On the other hand, in view of the temporal stability of the coating composition, the content is preferably less than a particular amount. Accordingly, the coating composition contains the siloxane resin in an amount of preferably 1 to 60 wt %, more preferably 5 to 50 wt %, based on the total weight of the composition including the solvent described later.

A typical example of the siloxane resin usable in the present invention can be obtained, for example, by hydrolysis of one or more alkoxysilane compounds represented by the following formula (A) in an organic solvent.

$$(R^1)_aSi(OR^2)_{4-a} \qquad (A)$$

In the above formula, $R^1$ is hydrogen atom, a substituted or unsubstituted alkyl group having 1 to 6 carbon atoms, a substituted or unsubstituted cycloalkyl group having 3 to 6 carbon atoms, a substituted or unsubstituted aralkyl group having 15 or less carbon atoms and having no hydrogen atom at the α-position carbon atom, a substituted or unsubstituted aryl group having 6 to 15 carbon atoms, or a substituted or unsubstituted alkenyl group having 1 to 6 carbon atoms; $R^2$ is a substituted or unsubstituted alkyl group having 1 to 6 carbon atoms; and a is an integer of 0 to 3.

Examples of the substituent group $R^1$ in the formula (A) include: (i) substituted or unsubstituted alkyl groups, such as, methyl, ethyl, n-propyl, iso-propyl, n-butyl, t-butyl, n-hexyl, n-decyl, trifluoromethyl, 2,2,2-trifluoroethyl, 3,3,3-trifluoropropyl, 3-hydroxypropyl, 3-glycidoxypropyl, 2-(3,4-epoxycyclohexyl)ethyl, 3-aminopropyl, 3-mercaptopropyl, 3-isocyanatopropyl, and 4-hydroxy-5-(p-hydroxyphenyl carbonyloxy)pentyl; (ii) substituted or unsubstituted cycloalkyl groups, such as, cyclopropyl, cyclobutyl, cyclopentyl, and cyclohexyl; (iii) substituted or unsubstituted aralkyl groups, such as, phenylisopropyl; (iv) substituted or unsubstituted aryl groups, such as, phenyl, tollyl, p-hydroxyphenyl, and naphthyl; and (v) substituted or unsubstituted alkenyl groups, such as, vinyl, allyl, 3-acryloxypropyl, and 3-methacryloxypropyl.

Examples of the substituent group $R^2$ include the substituted or unsubstituted alkyl groups shown above as examples of the substituent group $R^1$. Among them, the substituent group $R^2$ is preferably an unsubstituted alkyl group having 1 to 4 carbon atoms.

Concrete examples of the alkoxysilane compound represented by the above formula (A) include the followings:

(α) tetraalkoxysilane, such as, tetramethoxysilane, tetraethoxysilane, and tetrapropoxysilane;

(β) monoalkyltrialkoxysilane, such as, monomethyltrimethoxysilane, monomethyltriethoxysilane, monoethyltrimethoxysilane, monoethyltriethoxysilane, monopropyltrimethoxysilane, and monopropyltriethoxysilane;

(γ) monoaryltrialkoxysilane, such as, monophenyltrimethoxysilane, monophenyltriethoxysilane, and mononaphthyltrimethoxysilane;

(δ) trialkoxysilane, such as, trimethoxysilane, triethoxysilane, tripropoxysilane, and tributoxysilane;

(∈) dialkyldialkoxysilane, such as, dimethyldimethoxysilane, dimethyldiethoxysilane, diethyldimethoxysilane, diethyldiethoxysilane, dipropyldimethoxysilane, and dipropyldiethoxysilane;

(ζ) diphenyldialkoxysilane, such as, diphenyldimethoxysilane, and diphenyldiethoxysilane;

(η) alkylphenyldialkoxysilane, such as, methylphenyldimethoxysilane, methylphenyldiethoxysilane, ethylphenyldimethoxysilane, ethylphenyldiethoxysilane, propylphenyldimethoxysilane, and propylphenyldiethoxysilane; and (θ) trialkylalkoxysilane, such as, trimethylmethoxysilane, and tri-n-butylethoxysilane.

Among the above, preferred are tetramethoxysilane, tetraethoxysilane, monomethyltrimethoxysilane, monomethyltriethoxysilane, mononaphthyltrimethoxysilane, and monophenyltrimethoxysilane.

In the silanol or alkoxysilyl group-containing siloxane resin used in the present invention, the function of reactive groups is preferably fulfilled by the silanol groups alone or otherwise by the silanol groups and the alkoxysilyl groups in combination. This means that the siloxane resin can contain unreacted alkoxysilyl groups originated from starting materials. The above silanol or alkoxysilyl group-containing siloxane resin, in which only the silanol groups or otherwise the silanol groups and the alkoxysilyl groups in combination function as reactive groups, can be produced from one or more alkoxysilane compounds represented by the above formula (A). Further, if necessary, the siloxane resin adopted in the present invention can be obtained through hydrolysis-condensation from a mixture of: one or more alkoxysilane compounds of the formula (A) in which neither $R^1$ nor $R^2$ is a reactive group such as hydroxyl group, and one or more alkoxysilane compounds of the formula (A) in which $R^1$ and/or $R^2$ is a reactive group such as hydroxyl group. As a starting material for producing the siloxane resin in the present invention, it is preferred to use an alkoxysilane compound of the formula (A) in which the number a is 0 or 1. In addition, if necessary, another alkoxysilane compound of the formula (A) in which the number a is 2 or 3 can be further used in combination.

Another typical example of the siloxane resin usable in the present invention can be obtained, for example, by hydrolysis of one or more halosilane compounds represented by the following formula (B) in an organic solvent.

$$(R^1)_aSiX_{4-a} \qquad (B)$$

In the above formula, $R^1$ and a are the same as those described above, and X is a halogen atom.

Examples of $R^1$ and a in the formula (B) are preferably the same as those described above for the formula (A). Examples of X include chlorine atom, bromine atom, and iodine atom.

From the above halosilane compound, a silanol group-containing siloxane resin can be produced in the same manner as when produced from the alkoxysilane compound of the formula (A). Specifically, for example, in the case of trichlorosilane compounds, some chlorosilyl groups undergo hydrolysis-condensation to form Si—O—Si bonds and the other chlorosilyl groups are hydrolyzed to be silanol groups. The content of the silanol groups in the resultant siloxane resin can be controlled by selecting the kind and amount of the adopted halosilane compound, the reaction conditions, and the like. If the halosilane compounds are alone adopted as the starting materials, all the reactive groups are silanol groups in the formed silanol group-containing siloxane resin.

The siloxane resin also can be produced from a combination of the compounds represented by the formulas (A) and (B).

The hydrolysis-condensation reaction of the silane compound for producing the siloxane resin is normally carried out in an organic solvent. There are no particular restrictions on the solvent of alkoxysilane solution as long as it can dissolve or disperse the formed resin. The solvent can be properly selected from known organic solvents. Examples of the organic solvent include: monovalent alcohols, such as, methyl alcohol, ethyl alcohol, propyl alcohol, butyl alcohol, isobutyl alcohol, and isoamyl alcohol; multivalent alcohols, such as, ethylene glycol, diethylene glycol, propylene glycol, glycerine, trimethylolpropane, and hexanetriol; monoethers or acetates of multivalent alcohols, such as, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether, propylene glycol monobutyl ether, and 3-methyl-3-methoxybutanol; esters, such as, methyl acetate, ethyl acetate, and butyl acetate; ketones, such as, acetone, methyl ethyl ketone, and methyl isoamyl ketone; and multivalent alcohol ethers obtained by alkyl-etherizing all hydroxyl groups of multivalent alcohols, such as, ethylene glycol dimethyl ether, ethylene glycol diethyl ether, ethylene glycol dipropyl ether, ethylene glycol dibutyl ether, propylene glycol dimethyl ether, propylene glycol diethyl ether, propylene glycol dibutyl ether, diethylene glycol dimethyl ether, diethylene glycol methyl ethyl ether, and diethylene glycol diethyl ether. The solvent used for the reaction of the alkoxysilane compound is usually also used as a solvent of the coating composition, which is successively applied on a substrate.

The molecular weight of the siloxane resin is properly selected according to, for example, the concentration of the composition and the content of reactive groups in the resin. However, the resin preferably has a molecular weight large enough not to vaporize together with the solvent in the prebaking step, which is carried out for the purpose of removing excess of the solvent after the composition is coated on a substrate. On the other hand, the resin preferably has such a small molecular weight that the hardening reaction can proceed sufficiently to harden the coating. In view of those, the siloxane resin has a weight average molecular weight (Mw) of preferably 300 to 20000, more preferably 400 to 10000, further preferably 600 to 5000. Here, the "weight average molecular weight" means a polystyrene-reduced weight average molecular weight determined by gel permission chromatography.

(b) Solvent

The coating composition according to the present invention comprises a particular polyol, which is represented by the following formula (1):

$$HOCH_2—(CH_2)_l—(CH(OH))_m—(O)_n—CH_2OH \qquad (1).$$

In the formula, l is 0 to 3, m is 0 or 1, and n is 0 or 1, provided that they satisfy the condition of 0≤l+m+n≤3; and each of the repeating units —($CH_2$)—, —(CH(OH))— and —(O)— can be randomly combined with each other.

As evident from the above formula, the above polyol has hydroxyl groups at both ends of a straight hydrocarbon chain. This straight hydrocarbon chain contains neither hydrocarbon side chains nor cyclic structures. However, one carbon atom can link to another carbon atom through an oxygen atom. This means that the straight hydrocarbon chain can have an ether bond.

Further, in addition to the hydroxyl groups at both ends, the straight hydrocarbon chain can have another hydroxyl group connecting to a carbon atom not positioned at the ends. Accordingly, the polyol is not restricted to a diol having hydroxyl groups at both ends, and can be a triol or tetraol having not only the hydroxyl groups at both ends but also another hydroxyl group.

Preferred examples of the polyol include: ethylene glycol, 1,3-propanediol, 1,4-butanediol, diethylene glycol, triethylene glycol, glycerol, 1,2,4-butanetriol, 1,2,5-pentanetriol, and diglycerol. Preferred are ethylene glycol, 1,3-propanediol, 1,4-butanediol, glycerol, 1,2,4-butanetriol, and 1,2,5-pentanetriol. Among them, further preferred are ethylene glycol, 1,3-propanediol, 1,4-butanediol, and glycerol. If used in combination, those polyols can bring a remarkable effect.

In the present invention, the polyol can contain an ether bond. However, since the polyol having no ether bond tends to have a large effect of improving the storage stability, it is preferred not to contain an ether bond.

There are no particular restrictions on the amount of the polyol contained in the coating composition of the present invention. The content of the polyol is properly controlled, for example, according to the molecular weight and structure of the adopted siloxane resin, to the kind of the adopted polyol, and to the aimed use of the coating composition. However, the more the composition contains the polyol, the more the storage stability tends to be improved. On the other hand, the less the composition contains the polyol, the more easily the polyol can be removed from the formed coating in the drying step carried out after the composition is coated. That is because the polyol generally has a relatively high boiling point. If the polyol is removed insufficiently, the formed coating can be sticky enough to cause problems of, for example, contaminating the production equipments. In view of those, the coating composition according to the present invention contains the polyol in an amount of preferably 0.5 to 40 wt %. more preferably 1 to 30 wt %, based on the total weight of the composition.

In addition to the above polyol serving as a solvent, the coating composition of the present invention can contain other solvents, such as, alkylene glycol monoalkyl ethers. If containing an alkylene glycol monoalkyl ether additionally, the composition can be further improved in temporal stability.

The alkylene glycol monoalkyl ether is preferably represented by the following formula (2):

$$HO—[(CH_2)_p—O—]_q—(CH_2)_rH \qquad (2).$$

In the formula, p is 1 to 6, preferably 1 to 3; q is 1 to 3, preferably 1; and r is 1 to 6, preferably 1 to 3.

Preferred examples of the polyol include: monoethers of multivalent alcohols, such as, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether, propylene glycol monobutyl ether, and 3-methyl-3-methoxybutanol. Among them, particularly preferred are ethylene glycol monomethyl ether, ethylene glycol monoethyl ether, propylene glycol monomethyl ether, and propylene glycol monoethyl ether.

There are no particular restrictions on the content of the polyalkylene glycol monoalkyl ether in the coating composition of the present invention. However, the larger the content is, the more the temporal stability is improved. On the other hand, the content is preferably small enough to prevent evaporation so that the composition can not experience an increase in viscosity. In view of those, the composition according to the present invention contains the alkylene glycol monoalkyl ether in an amount of preferably 5 to 90 wt %. more preferably 10 to 70 wt %, based on the total weight of the composition.

For the purpose of improving the temporal stability, the coating composition according to the present invention comprises the above polyol and, if necessary, the alkylene glycol monoalkyl ether. However, in view of the treatability and the coatability, the coating composition preferably furthermore comprises a diluent solvent. The diluent solvent can be freely selected from solvents generally used in conventional coating compositions. Further, it is also possible to adopt a solvent used in the hydrolysis-condensation reaction of alkoxysilane compound directly as the organic solvent of the coating composition.

Examples of the diluent solvent include: (i) diethylene glycol dialkyl ethers, such as, diethylene glycol dimethyl ether, diethylene glycol diethyl ether, diethylene glycol dipropyl ether, and diethylene glycol dibutyl ether; (ii) ethylene glycol alkyl ether acetates, such as, methyl cellosolve acetate, and ethyl cellosolve acetate; and propylene glycol alkyl ether acetates, such as, propylene glycol monomethyl ether acetate, propylene glycol monoethyl ether acetate, and propylene glycol monopropyl ether acetate; (iii) carboxylates, such as, ethyl acetate, butyl acetate, and 3-methyl-3-methoxybutyl acetate; (iv) aromatic hydrocarbons, such as, benzene, toluene, and xylene; and (v) ketones, such as, methyl ethyl ketone, acetone, methyl amyl ketone, methyl isobutyl ketone, and cyclohexanone.

There are no particular restrictions on the content of the diluent solvent in the present invention. However, there are some solvents insufficiently compatible with the above polyol or alkylene glycol monoalkyl ether. If incapable of forming a homogeneous mixed solvent, they often cause unfavorable defects when the composition is coated. Accordingly, the solvents are preferably incorporated in such a ratio that they can be homogeneously mixed.

The total amount of the solvents in the coating composition can be freely selected according to the used resin, the kinds of the used additives, the aimed viscosity of the composition, and the like. However, it is generally 1 to 99 wt %, preferably 40 to 97.5 wt %, more preferably 60 to 95 wt %, based on the total weight of the composition. If the composition contains the solvents in this range, it is easy to form an insulating film of preferred thickness in electronic elements.

(c) Additives

The coating composition of the present invention can contain other additives according to necessity. Examples of the usable additives include surfactants, photosensitive materials, hardening agents, thickening agents, and smoothing agents. The surfactants are incorporated so as to improve the composition in coatability and wettability on the substrate. There are many known surfactants, such as, anionic surfactants, cationic surfactants, nonionic surfactants, and amphoteric surfactants. Among them, nonionic surfactants are preferred because they have fewer polar groups, which can lower the storage stability of the composition.

Examples of the nonionic surfactants usable in the present invention include: polyoxyethylene alkyl ethers, such as, polyoxyethylene lauryl ether, polyoxyethylene oleyl ether, and polyoxyethylene cetyl ether; polyoxyethylene fatty acid diesters; polyoxy fatty acid monoesters; polyoxyethylene polyoxypropylene block-polymers; acetylene alcohols; acetylene glycols; polyethoxylates of acetylene alcohols; acetylene glycol derivatives, such as, polyethoxylate of acetylene glycol; fluorine-containing surfactants, such as, Fluorad ([trademark], manufactured by Sumitomo 3M Limited), MEGAFAC ([trademark], manufactured by DIC Corporation), and Surufuron ([trademark], manufactured by Asahi Glass Co., Ltd.); and organic siloxane surfactants, such as, KP341 ([trademark], manufactured by Shin-Etsu Chemical Co., Ltd.). Examples of the above acetylene glycols include: 3-methyl-1-butyne-3-ol, 3-methyl-1-pentyne-3-ol, 3,6-dimethyl-4-octyne-3,6-diol, 2,4,7,9-tetramethyl-5-decyne-4,7-diol, 3,5-dimethyl-1-hexyne-3-ol, 2,5-dimethyl-3-hexyne-2,5-diol, and 2,5-dimethyl-2,5-hexanediol.

The coating composition contains the surfactant in an amount of preferably 50 to 100000 ppm, more preferably 100 to 50000 ppm, based on the total weight of the composition. If the amount is too small, the composition cannot obtain surface activity enough to improve the wettability. On the other hand, however, if containing the surfactant too much, the composition often foams insomuch that bubbles can be generated in the coating machine and hence that the treatability can be lowered. Accordingly, that should be paid attention to.

Further, if containing a photosensitive material, the coating composition according the present invention can be employed as a photosensitive siloxane composition. This photosensitive siloxane composition serves as a positive-working composition, the coating of which in the exposed area is soluble in an alkali developer and hence can be removed by development. Examples of the photosensitive material preferably used in the present invention include diazonaphthoquinone derivatives, which are esters of phenolic hydroxyl-containing compounds with naphthoquinonediazidesulfonic acids. There are no particular restrictions on the structure of the diazonaphtoquinone derivative, but the derivative is preferably an ester compound derived from a compound having one or more phenolic hydroxyl groups. Examples of the naphthoquinonediazidesulfonic acids include 4-naphthoquinonediazidesulfonic acid and 5-naphthoquinonediazidesulfonic acid. Since having an absorption band in the wavelength range of i-line light (wavelength: 365 nm), the 4-naphthoquinonediazidesulfonic ester compound is suitable for i-line light exposure. On the other hand, since having an absorption band in a wide wavelength range, the 5-naphthoquinonediazidesulfonic ester compound is suitable for exposure in a wide wavelength range. Accordingly, it is preferred to select 4- or 5-naphthoquinonediazidesulfonic ester compound according to the wavelength for exposure. It is also possible to use both of them in combination.

There are no particular restrictions on the phenolic hydroxyl-containing compound. Examples thereof are shown as follows (in which all the compound names except "bisphenol A" are trade names [trademark] manufactured by HONSHU CHEMICAL INDUSTRY CO., LTD.).

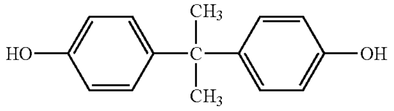

ﾋﾞｽﾌｪﾉｰﾙA

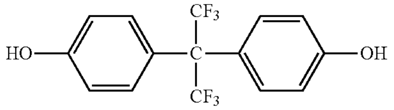

BisP-AF

-continued

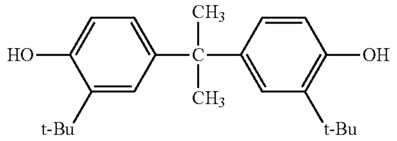

BisOTBP-A

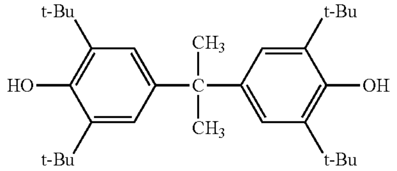

Bis26B-A

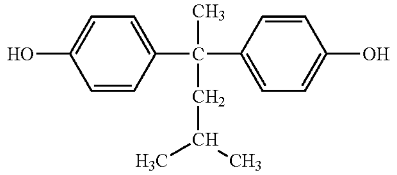

BisP-MIBK

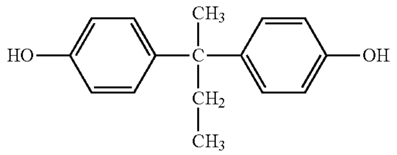

BisP-B

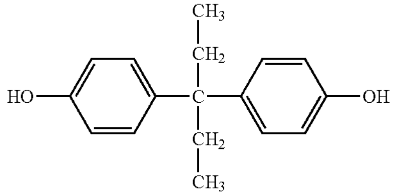

BisP-DEK

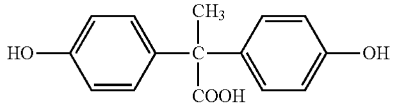

BisP-PR

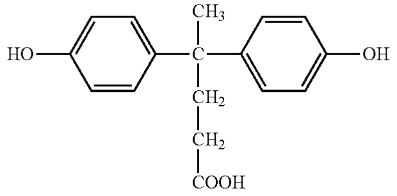

BisP-LV

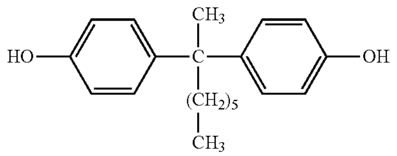

BisP-OT

-continued
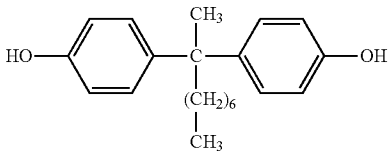
BisP-NO
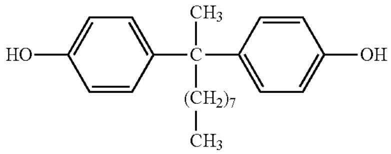
BisP-DE
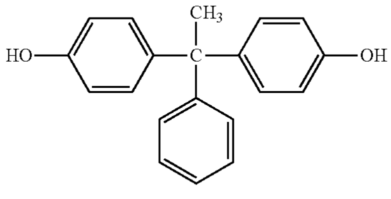
BisP-AP
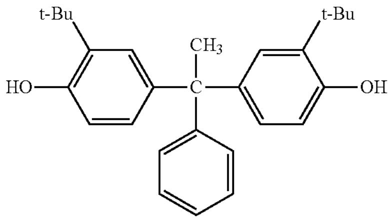
BisOTBP-AP
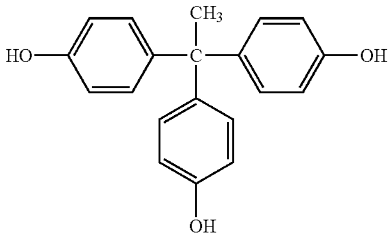
TrisP-HAP
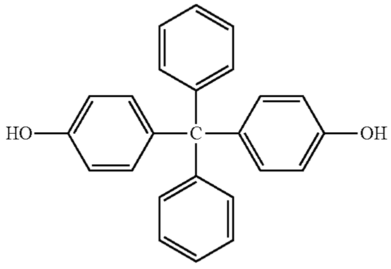
BisP-DP
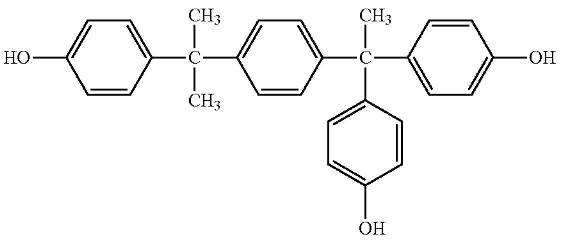
TrisP-PA
-continued
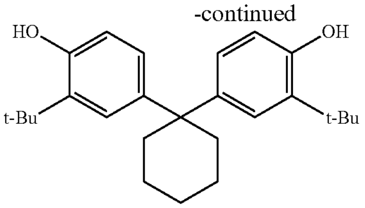
BisOTBP-Z
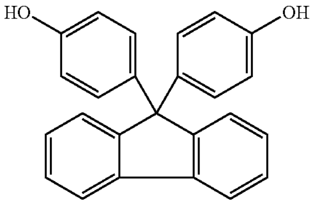
BisP-FL
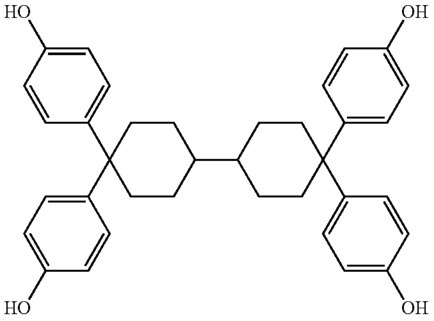
TekP-4HBP
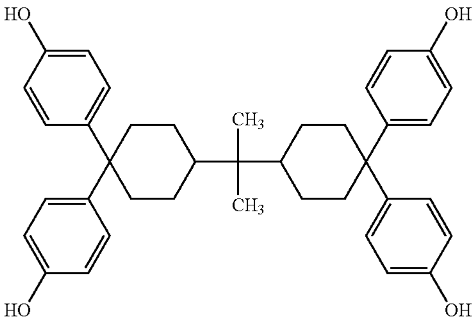
TekP-4HBPA
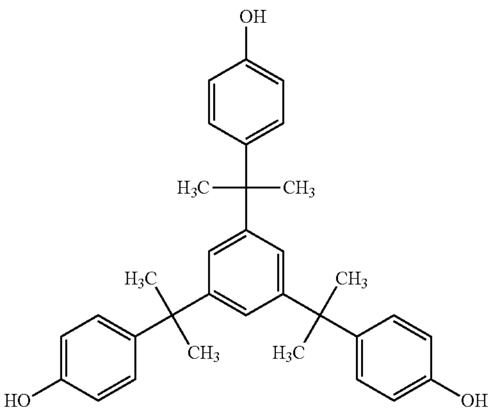
TrisP-TC
If the diazonaphthoquinone derivative is contained as a photosensitive material, the content thereof is preferably 3 to 20 wt %, more preferably 5 to 15 wt %, based on the total weight of the siloxane resin although the optimum content depends on the esterifying ratio of the naphthoquinonediazidesulfonate, on the properties of the used polysiloxane, on the required sensitivity, and on the dissolution contrast between the exposed and unexposed areas. If contained in an amount of less than 3 wt %, the diazonaphthoquinone derivative often causes such low dissolution contrast between the exposed and unexposed areas that the composition cannot have practical photosensitivity. In order to realize favorable dissolution contrast, the content is preferably 8 wt % or more. On the other hand, however, if the diazonaphthoquinone derivative is added in an amount of more than 20 wt %, the compatibility between the polysiloxane and the quinonediazide compound can be lowered to cloud or whiten the formed coating and/or the quinonediazide compound can decompose in the thermal curing to color the hardened film remarkably and hence to lower the colorless transparency of the film. Further, if contained too much, the diazonaphtoquinone derivative often thermally decomposes to cause troubles in the post-process, for example, to deteriorate the electric insulation of the hardened film and/or to release gases. That is because the diazonaphthoquinone derivative has heat-resistance lower than the polysiloxane. In addition, it is also feared that the resultant hardened film can have low resistance against a photoresist stripper containing, for example, monoethanol amine as a main agent.

The hardening agent is a compound that generates a reaction accelerator by heat. There are many known hardening agents, but thermal acid generators and thermal base generators are preferably adopted. Examples of the thermal acid generators include: benzointosylate, tri(nitrobenzyl)phosphate, trianisoin phosphate, diaryliodonium salts, and triarylsulfonium salts. Examples of the thermal base generators include: nitrobenzyl cyclohexylcarbamate, di(methoxybenzyl)hexamethylene carbamate, and 1,8-diazabicyclo-(5.4.0) undecene-7-orthophthalate. The content of the hardening agent is preferably 0.001 to 5 wt %, more preferably 0.05 to 2 wt %, based on the weight of the siloxane polymer.

The coating composition according to the present invention has excellent temporal stability, and enables to form a siliceous film having favorable properties, such as, high transparency, high insulation, and low dielectricity.

Siliceous Film

The siliceous film according to an embodiment of the present invention is formed by the steps of: applying the above coating composition onto the surface of a substrate, such as, a silicon substrate, a glass substrate, a resin film, a substrate having wiring, and a light-extraction part of display device such as FPD, so as to form a coating; and then curing the coating.

The coating of the composition according to the present invention can be formed by any of normal coating methods, such as, dip coating, roll coating, bar coating, coating with a brush, spray coating, doctor coating, flow coating, spin coating, and slit coating. Those are generally known as methods for coating conventional photosensitive compositions. If the substrate is a film, it is also possible to adopt gravure coating. According to necessity, the coating process can comprise a drying step in which the solvent is removed from the coating. Further, if necessary, the composition can be applied once, twice or more times to form a coating of desired thickness.

Subsequently, the coating formed on the substrate can be pre-baked to remove at least a part of the organic solvent from the coating. The pre-baking temperature is properly determined according to the kind of the organic solvent contained in the coating. If the temperature is too low, the solvent generally remains insomuch that equipments for conveying the substrate can be damaged. On the other hand, however, if the temperature is too high, the coating is dried so rapidly that the pre-baking procedure can cause problems of forming unevenness of the coating and of sublimating the silanol or alkoxysilyl group-containing siloxane resin. Accordingly, the pre-baking temperature is preferably 60 to 200° C., more preferably 80 to 150° C. The pre-baking procedure can be carried out by means of a heating apparatus, such as, a hotplate or an oven. The time for prebaking is properly controlled according to the kind and amount of the used solvent and to the pre-baking temperature, but is preferably 30 seconds to 10 minutes, more preferably 1 to 5 minutes.

In the case where the coating composition contains a photosensitive material, the pre-baked coating is imagewise exposed to form a desired pattern. The exposure can be carried out in a conventionally known manner, such as, mask exposure or scanning exposure. Light normally used for the exposure is, for example, g-line light, h-line light, i-line light, light in a broad wavelength band including g-, h- and i-lines, KrF excimer laser beams, ArF excimer laser beams, or electron beams.

The exposed coating is developed in a desired manner. The development can be carried out in water or an alkali aqueous solution, preferably, in an alkali aqueous solution. There are no particular restrictions on the development method, and the coating can be developed by a normal method, such as, by immersing (dipping) in an alkali aqueous solution or by subjecting to paddle, shower, slit, cap-coat or spraying development.

The alkali aqueous solution can contain any alkaline compound. However, it is preferred to use an organic alkaline compound. Examples of the organic alkaline compound include: tertiary ammonium compounds, aminoalcohols (alkanol amines), aqueous ammonia, alkyl amines, and heterocyclic amines. Preferred examples of the tertiary ammonium compounds include: tetramethylammonium hydroxide (hereinafter, often referred to as "TMAH"), tetraethylammonium hydroxide, tetrapropylammonium hydroxide, trimethylethylammonium hydroxide, trimethyl-(2-hydroxyethyl)ammonium hydroxide (choline), triethyl(2-hydroxyethyl)ammonium hydroxide, tripropyl-(2-hydroxyethyl)ammonium hydroxide, and trimethyl-(2-hydroxypropyl)ammonium hydroxide. Among them, preferred is TMAH.

The aqueous solution containing an inorganic alkaline compound can be used without any problem for applications not concerned with electric properties or semiconductor properties, such as, for production of hard coat films. However, since the inorganic alkali aqueous solution contains metal ions such as sodium and potassium ions, it is not preferred to adopt the inorganic alkali solution for applications in which account must be taken of electric properties or semiconductor properties, for example, for production of interlayer dielectric films or flattening films in TFTs.

In the present invention, the concentration of the alkali aqueous solution for development depends on various factors, such as, the kind and content of the used alkali, the kind of the silanol or alkoxysilyl group-containing siloxane resin to be treated, and the thickness of the coating, and hence is not particularly restricted. However, the alkali aqueous solution has a concentration of generally 1 to 5%, preferably 1.5 to 3%.

The time for development is preferably about 15 seconds to 3 minutes in general. The developing time is preferably short in view of the production efficiency, but is preferably short enough to reduce variations of the development results. The development can be carried out at room temperature.

Successively after the development, the coating can be subjected to rinse treatment, which is carried out so that the alkali aqueous solution and residues remaining on the surface of the developed coating can be washed away with water. Accordingly, any rinsing method can be used as long as it can wash away the alkali aqueous solution and the like from the coat surface. For example, the coating can be immersed in water, can be exposed to water flow, or can be showered with water. Those conventionally known rinsing methods can be properly selected to use. The time for rinse treatment is not particularly restricted as long as the alkali solution can be removed from the coating surface. For example, the time for immersion rinse and for rinse with flowing water can be about 30 seconds to 5 minutes and 15 seconds to 3 minutes, respectively. For applications in which account must be taken of electric properties or semiconductor properties, the rinse treatment is preferably carried out with deionized or pure water. Further, in the immersion rinse treatment, the coating can be twice or more immersed in different baths.

The curing temperature for hardening the coating can be freely selected as long as the coating can be hardened. However, if the temperature is too low, the reaction cannot proceed enough to harden the coating sufficiently. The temperature is therefore preferably 150° C. or more. Nevertheless, if containing a hardening agent as an additive, the coating can be sufficiently hardened even at a temperature of about 150° C. If OH-groups are left, the resultant film tends to have a high dielectric constant because of polarity of the OH-groups. Accordingly, in the case where the resultant siliceous film is required to have a low dielectric constant, it is preferred to harden the coating at a high temperature, such as, at 200° C. or more. On the other hand, however, if the curing temperature is too high, the cost of thermal energy increases. That is hence not preferred. The curing temperature is therefore preferably 450° C. or less, more preferably 350° C. or less. The curing time is not particularly restricted but preferably 15 minutes to 3 hours. If the curing time is too long, the resultant film is liable to suffer from cracks. That should be paid attention to. The curing procedure is normally carried out in air, but can be performed in an inert gas atmosphere, such as, nitrogen, helium or argon atmosphere, if necessary.

The siliceous film thus prepared according to the present invention has excellent properties. Specifically, the siliceous film of the present invention has a heat resistance up to 400° C. or more, a light-transmittance of 95% or more, a dielectric constant of 3.3 or less, and a refractive index of 1.6 or more. Accordingly, the siliceous film according to the present invention realizes such a high refractive index, such a low dielectric constant and such a high light-transmittance as normal silicon materials cannot have, and hence is usable for optical applications, such as, optical devices, LEDs, and OLEDs. Specifically, the siliceous film of the present invention can be employed for: optical devices, such as, flexible substrates, solid-state image sensing devices, anti-reflection films, anti-reflection plates, optical filters, superluminescent light emitting diodes, solar cells, and optical waveguides; and parts of semiconductor devices, such as, surface coats of light-extracting members, touchscreens, hard coats, and protective films.

The present invention will be further explained concretely by use of the following examples and comparative examples. However, those examples and comparative examples by no means restrict the present invention.

Production Example 1

Production of Siloxane Resin X

In 200 g of 3-methyl-3-methoxybutanol, 47.6 g (0.35 mol) of methyltrimethoxysilane, 29.7 g (0.15 mol) of phenyltrimethoxysilane and 4.83 g (0.015 mol) of 3,3',4,4'-benzophenonetetracarboxylic dianhydride were dissolved. While the solution was stirred at 60° C., 34.2 g of distilled water was added therein. The solution was then kept stirred and heated for 1 hour to conduct hydrolysis-condensation. Subsequently, the solution was washed five times with water, and the ethyl acetate oil layer was collected. The ethyl acetate oil layer was concentrated and then the ethyl acetate was replaced with propylene glycol monomethyl ether acetate, to obtain a 40% solution of methyl-phenyl silsesquioxane condensation polymer.

The obtained siloxane resin X was a methyl-phenyl silsesquioxane (methyl:phenyl=7:3 by molar ratio) having a weight average molecular weight (Mw) of 2000.

Here, the weight average molecular weight (Mw) was determined according to gel-permission chromatographic measurement based on monodispersed polystyrene standard by means of HPLC (GPC system) manufactured by Shimadzu Corporation and two GPC columns (Super Multipore HZ-N [trademark], manufactured by TOSOH CORPORATION) under the conditions of flow: 0.7 mL/minute, eluting solvent: tetrahydrofuran, and column temperature: 40° C.

Production Example 2

Production of Siloxane Resin Y

In a 300 mL four-necked flask equipped with a stirrer, a reflux condenser, a dropping funnel and a thermometer, 14.8 g of water, 1.4 g of 35 wt % hydrochloric acid and 44.8 g of toluene were placed. Separately, 3-acetoxypropyltrimethoxysilane (0.05 mol), 40.8 g (0.3 mol) of methyltrimethoxysilane and 29.7 g (0.15 mol) of phenyltrimethoxysilane were dissolved in 30 g of toluene. The resultant mixture was dropped into the four-necked flask at a temperature of 15 to 25° C. Thereafter, the reaction mixture was stirred at the same temperature for 30 minutes, and then water was added therein. After settled, the mixture was subjected to liquid separation operation to collect the oil layer.

Subsequently, after washed three times with water, the toluene oil layer was collected in an egg-plant shaped flask. The obtained liquid was then concentrated with an evaporator, and diluted with methanol so as to replace the solvent with methanol in such an amount that the total weight might be 250 g. To the obtained solution, 50 g of water was added and then 30.8 g (0.223 mol) of potassium carbonate was further added at room temperature. After the solution was stirred for 1 hour, ethyl acetate and water were added and then the oil layer was collected.

After washed five times with water, the ethyl acetate oil layer was collected. The ethyl acetate oil layer was concentrated and the ethyl acetate was replaced with propylene glycol monomethyl ether acetate, to obtain a 40% solution of 3-hydroxypropyl silsesquioxane condensation polymer.

The obtained 3-hydroxypropyl silsesquioxane condensation polymer Y had a weight average molecular weight (Mw) of 3000, and contained groups of methyl, 3-hydroxypropyl and phenylsilsesquioxane (methyl:3-hydroxypropyl:phenyl=6:1:3 by molar ratio).

Production Example 3

Production of Siloxane Resin Z

In 200 g of 3-methyl-3-methoxybutanol, 47.6 g (0.35 mol) of methyltrimethoxysilane, 29.7 g (0.15 mol) of phenyltrimethoxysilane and 4.83 g (0.015 mol) of 3,3',4,4'-benzophenonetetracarboxylic dianhydride were dissolved. While the solution was stirred at room temperature, 34.2 g of distilled water was added therein. The solution was then kept stirred and heated for 1 hour so as to conduct hydrolysis-condensation. The resultant solution was washed five times with water, and then the ethyl acetate oil layer was collected. The ethyl acetate oil layer was concentrated and the ethyl acetate was replaced with propylene glycol monomethyl ether acetate, to obtain a 40% solution of methyl-phenyl silsesquioxane condensation polymer.

The obtained siloxane resin Z was soluble in an alkali aqueous solution, and was a methyl-phenyl silsesquioxane (methyl:phenyl=7:3 by molar ratio) having a weight average molecular weight (Mw) of 1000.

Production Example 4

Production of Siloxane Resin W

In a reaction vessel, 600 mL of water was placed. While the water was stirred at 30° C., a mixture of 283.5 g (1 mol) of p-methoxybenzyl trichlorosilane and 300 mL of toluene was dropped therein for 2 hours so as to conduct hydrolysis. The obtained solution was subjected to liquid separation operation to remove the aqueous layer, and then the solvent was distilled off from the organic layer by means of an evaporator. The obtained condensed liquid was heated at 200° C. for 2 hours under reduced pressure to conduct polymerization reaction. The resultant polymer was dissolved in 200 g of acetonitrile to obtain a solution of p-methoxybenzyl silsesquioxane.

After 240 g of trimethylsilyl iodide was dropped therein at 60° C. or less, the obtained solution was left at 60° C. for 10 hours to conduct the reaction. After the reaction was completed, 200 g of water was added so as to conduct hydrolysis and thereafter the polymer layer was collected by decantation. The polymer layer was dried in vacuum, to obtain 165 g of p-hydroxybenzyl silsesquioxane, whose weight average molecular weight was measured by GPC and found to be 3000.

Example 1

To 61.25 g of methyl-phenyl silsesquioxane solution (methyl:phenyl=7:3 by molar ratio; weight average molecular weight (Mw): 2000) prepared in Production example 1, 0.5 g of a surfactant KF-54 ([trademark], manufactured by Shin-Etsu Chemical Co., Ltd.) was added. Further, 5.00 g of 1,3-propanediol and 33.25 g of PGMEA as solvents were added. The mixture was stirred to obtain a 25% solution. The obtained solution was filtrated through a 47 mmϕ filter (filtration accuracy: 0.1 μm; PTFE [trademark], manufactured by Advantec Toyo Kaisha Ltd.) under a pressure increased by 0.05 MPa, and then collected in a clean polyethylene container (AC100-H [trademark], manufactured by AICELLO CHEMICAL CO., Ltd.) to prepare a coating composition.

Examples 2 to 15 and Comparative Examples 1 to 10

The procedure of Example 1 was repeated except for changing the siloxane resin, the solvent and the contents into those shown in Tables 1 to 3, to prepare coating compositions.

Test for Storage Stability

With respect to the prepared compositions, the storage stability was evaluated. Each coating composition was left at room temperature, and regularly sampled to measure the kinematic viscosity. The storage stability was estimated according to how many days it took for the viscosity to increase by 5% or more from the initial value. The kinematic viscosity was determined by means of an automatic viscometer (VMC-252 [trademark], manufactured by RIGO Co., Ltd.).

Transmittance

The UV-visible absorption spectrum of each obtained hardened film was measured by means of a spectrophotometer (MultiSpec-1500 [trademark], manufactured by Shimadzu Corporation), to obtain a transmittance at 400 nm.

Dielectric Constant

The coating composition obtained in each of Examples 1 to 15 and Comparative examples 1 to 10 was coated on a silicon wafer according to spin-coating method by means of a spin-coater (MS-A100 [trademark], manufactured by MIKASA CO., LTD.), to form a coating of 0.5 μm dry-thickness. The coating was hardened at 250° C. for 1 hour, and the resultant hardened film was subjected to C-V measurement with a capacitance measuring apparatus (manufactured by Solid State Instruments) according to mercury probe method. From the obtained saturation capacitance, the dielectric constant was estimated.

The results are as set forth in Table 1.

TABLE 1

| | Examples | | | | | | | | | |
|---|---|---|---|---|---|---|---|---|---|---|
| Components | 1 | 2 | 3 | 4 | 5 | 6 | 7 | 8 | 9 | 10 |
| siloxane resin X (g) | 61.25 | 61.25 | 61.25 | 61.25 | 61.25 | 61.25 | 61.25 | 61.25 | 61.25 | 61.25 |
| siloxane resin Y (g) | — | — | — | — | — | — | — | — | — | — |
| siloxane resin Z (g) | — | — | — | — | — | — | — | — | — | — |
| siloxane resin W (g) | — | — | — | — | — | — | — | — | — | — |
| photosensitive material P (g) | — | — | — | — | — | — | — | — | — | — |
| hardening agent H (g) | — | — | — | — | — | — | — | — | — | — |
| surfactant KF-54 (g) | 0.50 | 0.50 | 0.50 | 0.50 | 0.50 | 0.50 | 0.50 | 0.50 | 0.50 | 0.50 |
| 1,3 propanediol (g) (b.p.: 214° C.) | 5.00 | — | — | — | 1.00 | 5.00 | — | — | 4.50 | 2.00 |
| 1,4-butanediol (g) (b.p.: 228° C.) | — | 5.00 | — | — | — | — | 5.00 | — | — | 2.50 |
| diethylene glycol (g) (b.p.: 187° C.) | — | — | 5.00 | — | — | — | — | — | — | — |
| glycerine (g) (b.p.: 290° C.) | — | — | — | 1.00 | — | — | — | — | 0.50 | 0.50 |
| 1,2,4-butanetriol (g) (b.p.: 312° C.) | — | — | — | — | — | — | — | 3.00 | — | — |
| PGME (g) (b.p.: 121° C.) | — | — | — | 24.00 | 24.00 | 20.00 | 20.00 | 22.00 | 20.00 | 20.00 |

TABLE 1-continued

| Components | Examples | | | | | | | | | |
|---|---|---|---|---|---|---|---|---|---|---|
| | 1 | 2 | 3 | 4 | 5 | 6 | 7 | 8 | 9 | 10 |
| propylene glycol (g) (b.p.: 187° C.) | — | — | — | — | — | — | — | — | — | — |
| benzyl alcohol (g) (b.p.: 245° C.) | — | — | — | — | — | — | — | — | — | — |
| DMSO (g) (b.p.: 189° C.) | — | — | — | — | — | — | — | — | — | — |
| DMAc(g) (b.p.: 165° C.) | — | — | — | — | — | — | — | — | — | — |
| PGMEA (g) (b.p.: 146° C.) | 33.25 | 33.25 | 33.25 | 13.25 | 13.25 | 13.25 | 13.25 | 13.25 | 13.25 | 13.25 |
| n-butyl acetate (g) (b.p.: 126° C.) | — | — | — | — | — | — | — | — | — | — |
| storage stability (days) | 90 | 90 | 75 | 90 | 90 | 120 | 120 | 120 | 150 | 120 |
| transmittance (%) | 99 | 99 | 99 | 99 | 99 | 99 | 99 | 99 | 99 | 99 |
| dielectric constant | 3.0 | 3.0 | 3.0 | 3.0 | 3.0 | 3.0 | 3.0 | 3.0 | 3.0 | 3.0 |

TABLE 2

| Components | Examples | | | | |
|---|---|---|---|---|---|
| | 11 | 12 | 13 | 14 | 15 |
| siloxane resin X (g) | — | — | 61.25 | 61.25 | 60.50 |
| siloxane resin Y (g) | 61.25 | — | — | — | — |
| siloxane resin Z (g) | — | 51.25 | — | — | — |
| siloxane resin W (g) | — | — | — | — | — |
| photosensitive material P (g) | — | 4.00 | — | — | — |
| hardening agent H (g) | — | — | — | — | 0.30 |
| surfactant KF-54 (g) | 0.50 | 0.50 | 0.50 | 0.50 | 0.50 |
| 1,3-propanediol (g) (b.p.: 214° C.) | 5.00 | 5.00 | — | 5.00 | 5.00 |
| 1,4-butanediol (g) (b.p.: 228° C.) | — | — | — | — | — |
| diethylene glycol (g) (b.p.: 187° C.) | — | — | — | — | — |
| glycerine (g) (b.p.: 290° C.) | — | — | 0.50 | — | — |
| 1,2,4-butanetriol (g) (b.p.: 312° C.) | — | — | — | — | — |

TABLE 2-continued

| Components | Examples | | | | |
|---|---|---|---|---|---|
| | 11 | 12 | 13 | 14 | 15 |
| PGME (g) (b.p.: 121° C.) | 20.00 | 20.00 | 37.25 | — | 20.00 |
| propylene glycol (g) (b.p.: 187° C.) | — | — | — | — | — |
| benzyl alcohol (g) (b.p.: 245° C.) | — | — | — | — | — |
| DMSO(g) (b.p.: 189° C.) | — | — | — | — | — |
| DMAc(g) (b.p.: 165° C.) | — | — | — | — | — |
| PGMEA(g) (b.p.: 146° C.) | 13.25 | 19.25 | — | — | 13.70 |
| n-butyl acetate (g) (b.p.: 126° C.) | — | — | — | 33.25 | — |
| storage stability (days) | 120 | 120 | 90 | 90 | 90 |
| transmittance (%) | 99 | 99 | 99 | 99 | 99 |
| dielectric constant | 3.0 | 3.0 | 3.0 | 3.0 | 3.0 |

TABLE 3

| Components | Comparative examples | | | | | | | | | |
|---|---|---|---|---|---|---|---|---|---|---|
| | 1 | 2 | 3 | 4 | 5 | 6 | 7 | 8 | 9 | 10 |
| siloxane resin X (g) | 61.25 | 61.25 | 61.25 | 61.25 | 61.25 | 61.25 | 61.25 | — | 60.50 | — |
| siloxane resin Y (g) | — | — | — | — | — | — | — | — | — | — |
| siloxane resin Z (g) | — | — | — | — | — | — | — | 51.25 | — | — |
| siloxane resin W (g) | — | — | — | — | — | — | — | — | — | 61.25 |
| photosensitive material P (g) | — | — | — | — | — | — | — | 4.00 | — | — |
| hardening agent H (g) | — | — | — | — | — | — | — | — | 0.30 | — |
| surfactant KF-54 (g) | 0.50 | 0.50 | 0.50 | 0.50 | 0.50 | 0.50 | 0.50 | 0.50 | 0.50 | 0.50 |
| 1,3-propanediol (g) (b.p.: 214° C.) | — | — | — | — | — | — | — | — | — | — |
| 1,4-butanediol (g) (b.p.: 228° C.) | — | — | — | — | — | — | — | — | — | — |
| diethylene glycol (g) (b.p.: 187° C.) | — | — | — | — | — | — | — | — | — | — |
| glycerine (g) (b.p.: 290° C.) | — | — | — | 0.10 | — | — | — | — | — | — |
| 1,2,4-butanetriol (g) (b.p.: 312° C.) | — | — | — | — | — | — | — | — | — | — |
| PGME (g) (b.p.: 121° C.) | — | — | 25.00 | — | — | — | — | 20.00 | 20.00 | — |
| propylene glycol (g) (b.p.: 187° C.) | — | 5.00 | — | — | — | — | — | — | — | — |
| benzyl alcohol (g) (b.p.: 245° C.) | — | — | — | — | 5.00 | — | — | — | — | — |
| DMSO(g) (b.p.: 189° C.) | — | — | — | — | — | 5.00 | — | — | — | — |

TABLE 3-continued

| Components | Comparative examples 1 | 2 | 3 | 4 | 5 | 6 | 7 | 8 | 9 | 10 |
|---|---|---|---|---|---|---|---|---|---|---|
| DMAc(g) (b.p.: 165° C.) | — | — | — | — | — | — | 5.00 | — | — | — |
| PGMEA(g) (b.p.: 146° C.) | 38.25 | 33.25 | 13.25 | 38.15 | 33.25 | 33.25 | 33.25 | 24.25 | 18.70 | 38.25 |
| n-butyl acetate (g) (b.p.: 126° C.) | — | — | — | — | — | — | — | — | — | — |
| storage stability (days) | 60 | 60 | 60 | 60 | 60 | 45 | 45 | 60 | 45 | 120 |
| transmittance (%) | 99 | 99 | 99 | 99 | 99 | 99 | 99 | 99 | 99 | 72 |
| dielectric constant | 3.0 | 3.0 | 3.0 | 3.0 | 3.0 | 3.0 | 3.0 | 3.0 | 3.0 | N/A* |

Remarks)

Photosensitive material P: naphthoquinone photosensitive material represented by the following formula:

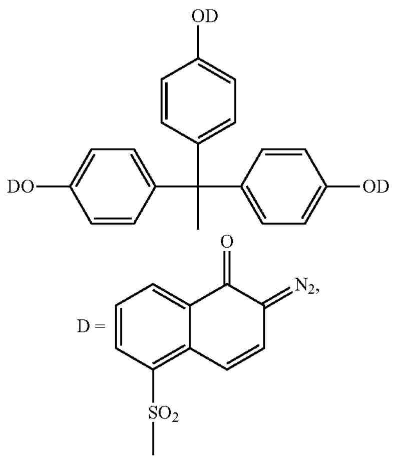

Hardening agent H: 1,8-diazabicyclo(5.4.0)undecene-7-orthophthalate,

DMSO: dimethyl sulfoxide, and

DMAc: dimethyl acetone.

The dielectric constant of Comparative example 10 was unmeasurable because the formed film was an insulator.

The invention claimed is:

1. A coating composition comprising a siloxane resin having silanol groups or alkoxysilyl groups, and a polyol represented by the following formula (1):

$$HOCH_2—(CH_2)_l—(CH(OH))_m—(O)_n—CH_2OH \quad (1)$$

in which l is 0 to 3, m is 0 or 1, and n is 0 or 1, provided that they satisfy the condition of $0 \leq l+m+n \leq 3$; and each of the repeating units $—(CH_2)—$, $—(CH(OH))—$ and $—(O)—$ can be randomly combined with each other, further comprising a solvent selected from the group consisting of propylene glycol alkyl ether acetate and butyl acetate.

2. The coating composition according to claim 1, wherein said polyol is selected from the group consisting of ethylene glycol, diethylene glycol, 1,3-propanediol, 1,4-butanediol, glycerol, 1,2,4-butanetriol, and 1,2,5-pentanetriol.

3. The coating composition according to claim 1, further comprising an alkylene glycol monoalkyl ether.

4. The coating composition according to claim 3, wherein said alkylene glycol monoalkyl ether is represented by the following formula (2):

$$HO—[(CH_2)_p—O—]_q—(CH_2)_rH \quad (2)$$

in which p is 1 to 6, q is 1 to 3, and r is 1 to 6.

5. The coating composition according to claim 3, wherein said alkylene glycol monoalkyl ether is selected from the group consisting of: ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether, propylene glycol monobutyl ether, and 3-methyl-3-methoxybutanol.

6. The coating composition according to claim 1, where the solvent is propylene glycol monomethyl ether acetate.

7. The coating composition according to claim 1, wherein said siloxane resin has a weight average molecular weight of 400 to 20000.

8. A coating composition comprising a siloxane resin having silanol groups or alkoxysilyl groups, wherein said siloxane resin has a silsesquioxane structure, and a polyol represented by the following formula (1):

$$HOCH_2—(CH_2)_l—(CH(OH))_m—(O)_n—CH_2OH \quad (1)$$

in which l is 0 to 3, m is 0 or 1, and n is 0 or 1, provided that they satisfy the condition of $0 \leq l+m+n \leq 3$; and each of the repeating units $—(CH_2)—$, $—(CH(OH))—$ and $—(O)—$ can be randomly combined with each other.

9. A siliceous film obtained by the steps of:

coating a substrate with the coating composition according to claim 1, and curing the coated substrate at 150 to 450° C. in air or in an inert gas atmosphere.

10. The coating composition according to claim 1, wherein said polyol is selected from the group consisting of ethylene glycol, 1,3-propanediol, and glycerol.

11. The coating composition according to claim 1, wherein the composition contains the polyol in an amount from 0.5 to 40 wt % based on the total weight of the composition.

12. The coating composition according to claim 1, wherein the composition contains the polyol in an amount from 1 to 30 wt based on the total weight of the composition.

13. The coating composition according to claim 3 wherein said alkylene glycol monoalkyl ether is selected from the group consisting of: ethylene glycol monomethyl ether, ethylene glycol monoethyl ether, propylene glycol monomethyl ether, and propylene glycol monoethyl ether.

14. The coating composition according to claim 3 wherein the composition contains the alkylene glycol monoalkyl ether in an amount from 5 to 90 wt % based on the total weight of the composition.

15. The coating composition according to claim 3 wherein the composition contains the alkylene glycol monoalkyl ether in an amount from 10 to 70 wt % based on the total weight of the composition.

16. The coating composition according to claim 2, further comprising an alkylene glycol monoalkyl ether.

* * * * *